B. LEPPER.
Car Starter.
No. 103,897.  Patented May 7, 1870.
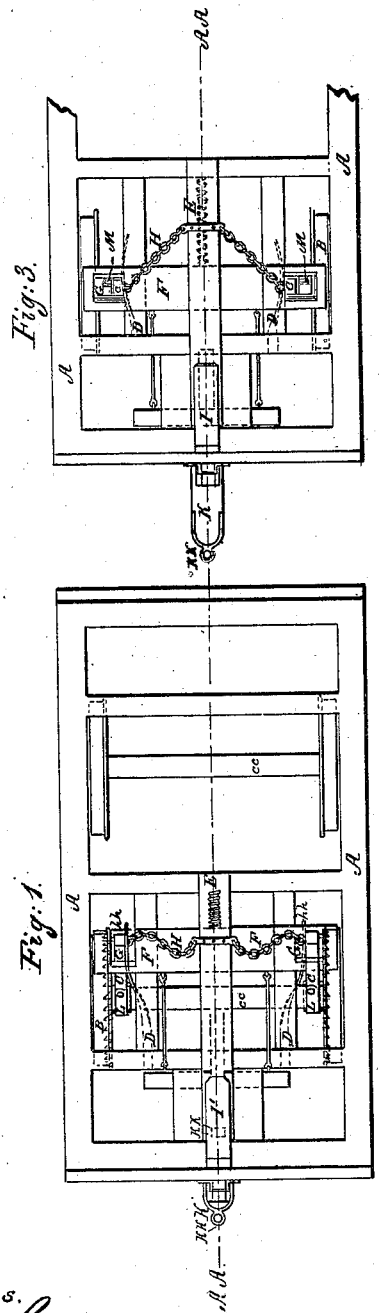
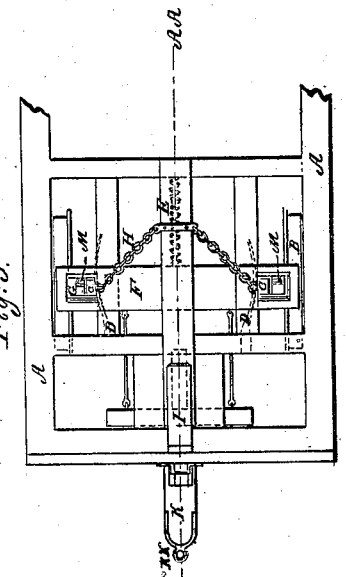
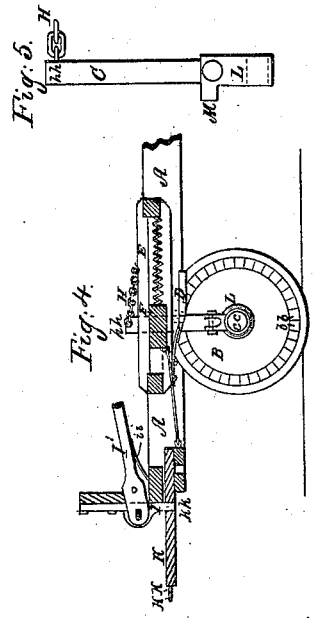
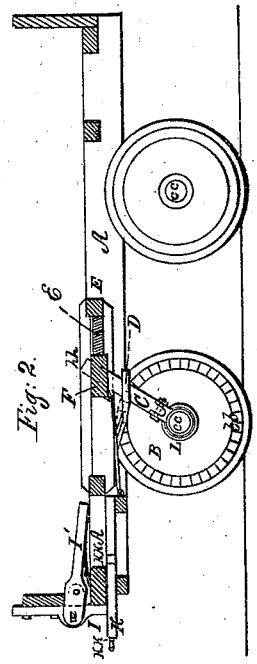
Witnesses.
Inventor;
Benj. Lepper
By McGill, Grant & Co.
his attys

United States Patent Office.

BENJAMIN LEPPER, OF ST. LOUIS, MISSOURI.

Letters Patent No. 103,897, dated June 7, 1870.

IMPROVEMENT IN STREET-CAR STARTERS.

The Schedule referred to in these Letters Patent and making part of the same.

*To all whom it may concern:*

Be it known that I, BENJAMIN LEPPER, of the city and county of St. Louis, State of Missouri, have invented a new and useful Improvement in Starting Street-Cars; and I do hereby declare that the following is a full and exact description thereof, reference being had to the accompanying drawings and to the letters of reference marked thereon, in which—

Figure 1 is a top view of the car, with levers and cross-head drawn back;

Figure 2, a section on the dotted lines A A;

Figure 3, a top view of the car, with the levers and cross-head drawn out;

Figure 4 is a section on dotted line A A, with levers drawn out; and

Figure 5, a view of the lever, with the pawl, to engage with the ratchet.

Similar letters of reference indicate the same parts.

A is the frame of the car.

B the wheels, with ratchet-teeth b b.

C, levers.

c c, axles.

D, springs to hold the levers against the wheels.

E is a spring to draw back the levers.

F is the cross-head connecting with the levers.

G is the slot for the lever to pass through the cross-head.

H is a chain connecting the levers to the frame of the car.

h h, points of connection of said chains with the levers.

I', foot-lever i i, spring on foot-lever.

K is the draft-rod.

k k is the slot in the draft-rod for the bolt I and the ring for attaching the horse to the car.

L is a strap for securing the lever to the axle.

M is a pawl to engage the teeth on the wheel B.

The nature of my invention consists in the construction and arrangement of parts by which the force in starting a car may be applied directly to the wheels, and in having the same so adjusted that it can be used at pleasure, as hereinafter more fully described.

To enable others skilled in the art to make and use my invention, I will proceed to describe its construction and operation.

I construct the wheels B with the ratchet-teeth b b upon their inner side, with the lever C turning upon the axle, to which they are secured by the strap L.

They are provided with the pawls M, which fall outward to engage with the ratchet-teeth b b.

The free ends of the levers C, which pass through the slots G, are connected to the frame of the car by the chains H H, the said chains being slack when the levers are thrown back, and becoming tightened when they are drawn forward. In the latter case they throw the levers C and pawl M away from the ratchet, and allow the wheels to revolve without injuring the pawl M or ratchet-teeth b b.

The springs D are constructed so as to hold the levers C and the pawl M against the ratchet b b. When they are drawn back, preparatory to moving the wheels, the levers C are pressed through the cross-head F at the slots G, and the whole is connected with the draft-rod K, thereby transmitting the power of the draft directly to the wheels.

The cross-head, and, with it, its connections, is thrown back when the draft is suspended, and the levers are put in position to act upon the ratchet-wheels by means of the spring E.

To prevent the return of the whole until it is required to start the car, the drum-bar K is provided with a slot, k k, through which, when it is drawn out to its full extent, the bolt I passes. This bolt is operated by the driver, by means of the foot-lever I'.

The manner in which my invention operates is as follows:

When the rod K is drawn out to its full length, and the driver wishes to take advantage of the levers C, he puts his foot on the foot-lever I' and lifts the bolt I out of the slot in the rod K. This permits the rod K to fly back, and with it carry the cross-head F, which carries the levers C back also. When the levers are pressed against the wheels by the spring D, and the rod K begins to move forward, it draws with it the wheels B by means of the levers C. By this means the power is transferred from the axle of the wheel to the circumference, which turns the said wheels with less force. By this means the wheels are turned until the rod K has run its full length, when the levers C are again thrown from their ratchets and the wheels by the chains H, as before, and the bolt I falls into the slots of the rod and prevents the rod K from flying back until the driver so desires, when he can again raise the bolt by the foot-lever. Thus the action may be repeated as often as the driver desires to avail himself of the use of the levers.

I claim the combination of the cross-head F, levers C, straps L, pawl M, inside ratchet b b, spring D, spring E, chains H, foot-lever I', bolt I, and spring i i, with each other, and the draw-bar K, as described and for purposes set forth.

Subscribed on this 25th day of November, 1868, at St. Louis, Missouri, in the presence of—

BENJAMIN LEPPER.

Witnesses:
 CHARLES H. CHAPIN,
 GEO. W. HALL.